United States Patent [19]

Asai

[11] 3,947,872

[45] Mar. 30, 1976

[54] PROCESS FOR THERMOREMANENT DUPLICATION OF MAGNETIC RECORDING MASTER TAPE ONTO SLAVE TAPE WITH REDUCED DIMENSIONAL CHANGES OF SLAVE TAPE

[75] Inventor: Takeo Asai, Sagamihara, Japan

[73] Assignee: Teijin Ltd., Osaka, Japan

[22] Filed: Nov. 21, 1974

[21] Appl. No.: 525,746

[30] Foreign Application Priority Data

Nov. 27, 1973 Japan.............................. 48-132537

[52] U.S. Cl. .................................................. 360/16
[51] Int. Cl.² ........................................... G11B 5/86
[58] Field of Search ...................................... 360/16

[56] References Cited
OTHER PUBLICATIONS

Dickens et al., "Thermoremanent Duplication of Magnetic Tape Recordings," Journal of SMPTE, Vol. 80, No. 3, Mar. 1971, pp. 177–178.

Primary Examiner—Robert S. Tupper
Attorney, Agent, or Firm—Sherman & Shalloway

[57] ABSTRACT

A process for thermoremanent duplication of a magnetic recording tape, which comprises recording magnetic signals by thermoremanent duplication on a slave tape consisting of a polyester film base and a layer of a ferromagnetic material coated thereon, and then heat-treating said magnetic recording slave tape without stretch at a temperature of at least 40°C. but less than the Curie point of said ferromagnetic material. Dimensional changes of the slave tape after thermal duplication are thereby reduced.

10 Claims, No Drawings

PROCESS FOR THERMOREMANENT DUPLICATION OF MAGNETIC RECORDING MASTER TAPE ONTO SLAVE TAPE WITH REDUCED DIMENSIONAL CHANGES OF SLAVE TAPE

FIELD OF THE INVENTION

This invention relates to a process for thermoremanent duplication of magnetic recording tapes. More specifically, it relates to a process for thermoremanent duplication of magnetic recording tapes which comprises thermoremanently duplicating the magnetic signals of a magnetic recording master tape (on which the magnetic signals to be duplicated are recorded) on a magnetic recording tape (to be referred to as a slave tape) consisting of a polyester film base and a magnetic layer coated thereon, characterized in that after the thermoremanent duplication step, the slave tape is heat-treated in an unstretched state under specific conditions, thereby to reduce the dimensional changes of the slave tape after the thermal duplication.

BACKGROUND OF THE INVENTION

The rate of magnetization of a ferromagnetic material abruptly increases at a temperature in the vicinity of its Curie point (T°C.), and therefore, it is easily magnetized even in a weak signal magnetic field. By cooling it directly, the magnetization can be fixed. Thermoremanent duplication is a technique developed by applying this theory, and has already been known in the art. Usually, the thermoremanent duplication process is carried out by heating a slave tape to a temperature above the Curie point of the ferromagnetic material contained in its magnetic layer, removing the heat source, then bringing the slave tape into intimate contact with a master tape, and cooling the slave tape to a temperature below the Curie point while maintaining this intimate contact. When the slave tape is then separated from the master tape, a magnetic signal of the same shape as in the master tape is recorded in the magnetic matrix of the slave tape.

Various materials can be used as a base film of the slave tape, but actually, polyester films are used. When a magnetic recording tape based on a polyester film is used as a slave tape, and subjected to the above-mentioned thermoremanent duplication, the slave tape is placed under some tension when heated to a temperature above the Curie point of the magnetic material and then brought into intimate contact with the master tape. Owing to this stretching tension under heating, the polyester base film stretches, although to a slight degree, and as a result, strain occurs in the slave tape. The extent of the strain depends mainly upon the tension to be exerted on the base film at the time of thermoremanent duplication. Generally, slave tapes which have thus developed strain do not return to the original length within a short period of time, but some strain still remains there even when the slave tape is allowed to cool to room temperature after the thermoremanent duplication step. This residual strain decreases very slowly at room temperature, and therefore the length of the thermoremanently duplicated slave tape becomes shorter with time at a very slow rate. Such a slow change in dimension of the slave tape, even to a slight extent presents serious problems especially when it is used for video magnetic recording. When video slave tapes are commercially produced by the thermoremanent duplication method using a master tape, a playing test of the slave tape must be carried out after a lapse of a certain period of time from the thermoremanent duplication in order to examine whether normal images are recorded in the slave tape. Even if the reproduction of normal images is confirmed at this time any subsequent change in the dimension of the slave tape ascribable to the reduction of the residual strain of the slave tape would cause skew in the reproduced images corresponding to the extent of the dimensional change of the tape when the user reproduces the tape after a long period of time. Such a skew greatly impairs the commercial value of the slave tape. Dimensional changes of the slave tape of course occur even in a time interval between the thermoremanent duplication and the playing test, but can be compensated by suitably controlling the thermoremanent duplication step. Accordingly normal images can be recorded at the time of the playing test, and therefore, this does not pose a serious problem. What matters is a dimensional change in slave tapes which occurs after the playing test. This troublesome dimensional change could be avoided by providing a tape-tension controller or skew controller in a video tape recorder, but this adds to the cost of the reproducing apparatus. It is very desirable therefore to maintain normal images ensured by the playing test without resorting to such means. In order to realize such a desire, it is necessary to minimize the dimensional change that may occur after the playing test so that no substantial skew occurs in the reproduced images at whatever time the user reproduces the slave tape. With the conventional thermoremanent duplication processes, there has been no way to avoid the dimensional change of the slave tape which proceeds slowly over very long periods of time after the thermoremanent duplication. However, if the playing test for quality examination is carried out after a very long period of time, for example, one week or 10 days, from the end of the thermoremanent duplication, the dimensional change of the slave tape that occurs after the playing test would be able to be reduced to an extent sufficient to cause no detrimental skew to the reproduced images. However the lengthening of the time duration between the thermoremanent duplication step and the playing test in this manner is not only uneconomical, but also makes it difficult to control the step of producing slave tapes.

SUMMARY OF THE INVENTION

An object of this invention is to provide a novel process for thermoremanent duplication which resolves this problem. Another object of this invention is to provide a process for thermoremanent duplication which makes it possible to perform the playing test at any desired time after the thermoremanent duplication.

According to a preferred embodiment of this invention, even when the playing test is performed immediately after the thermoremanent duplication, the dimensional change of the slave tape that may occur after the playing test can be reduced to an extent sufficient to cause no substantial skew to the reproduced images.

The present invention provides a process for thermoremanent duplication of a magnetic recording tape, which comprises recording magnetic signals by thermoremanent duplication on a slave tape consisting of a polyester film base and a layer of a ferromagnetic material coated thereon, and then heat-treating said magnetic recording slave tape without stretch at a temperature of at least 40°C. but less than the Curie point of said ferromagnetic material, preferably at a temperature ranging from 70°C. to a point 10°C. lower than the Curie point of said ferromagnetic material.

DESCRIPTION OF THE INVENTION

The polyester film used as a base of the slave tape in accordance with this invention is a film of a polyester in which at least 90 mol%, preferably substantially 100 mol%, of the entire recurring units consists of ethylene 2,6-naphthalenedicarboxylate, ethylene terephthalate or 1,4-cyclohexane terephthalate. Usually, such films are biaxially oriented and heat-set. A biaxially oriented film of poly(ethylene 2,6-naphthalenedicarboxylate) (to be referred to as PEN-2,6) is especially preferred for use as a base film of the slave tape. The base film usually has a thickness of 10 to 35 microns.

The ferromagnetic material to be coated on the base film is one suitable for thermoremanent duplication. Usually chromium dioxide-type ferromagnetic materials are used. The chromium dioxide-type materials per se are known, and available in various compositions. Any of these ferromagnetic materials can be used in the process of this invention. These chromium dioxide-type ferromagnetic materials have a Curie temperature of 110° to 155°C. Usually, those having a Curie point of 120° to 130°C. are used. The method of measuring the Curie point of a ferromagnetic material is well known to those skilled in the art, and in performing the present invention, The Curie point of the ferromagnetic material coated on the slave tape can be determined by this known method.

The thermoremanent duplication step per se carried out as a first step in the process of this invention is also known, and disclosed, for example in U.S. Pat. No. 3,364,496.

The novel feature of the present invention is that after magnetic signals have been transferred thermally from a master tape to a slave tape, the slave tape is heat-treated without stretch, thereby to stabilize the slave tape dimensionally.

The term "heat-treatment without stretching or stretchless heat-treatment", as used in the present specification and the appended claims, denotes a heat-treatment comprising continuously feeding the slave tape after thermoremanent duplication into a heat-treating zone by means of a roller unit, allowing it to pass through the zone, and then withdrawing it from the zone, in which slave tape is fed at an overfeed rate ($k$), as defined by the following equation, of 0 to 2%, preferably 0.02 to 2%

$$K = \frac{V_1 - V_2}{V_2} \times 100 \ (\%)$$

wherein $V_1$ is the rate of feeding the slave tape into the heat-treating zone, and $V_2$ is the rate of withdrawing the slave tape from the heat-treating zone.

The above stretchless heat-treatment can be effected either by contacting the slave tape with a heat source (a contact-type heat-treatment), or by heat-treating the slave tape without contacting it with a heat source (a non-contact-type heat-treatment).

The contact-type heat-treatment can be performed, for example, by passing the slave tape while its non-coated surface is in contact with a hot plate heated at a predetermined temperature. The non-contact-type heat-treatment can be performed, for example, by passing the slave tape through a slot formed in a plate heater or cylindrical heater kept at a predetermined temperature without keeping the tape in contact with the slot; or by blowing hot air at a predetermined temperature to the slave tape in a heat-treating zone from at least one side of it, preferably from that side of the tape which is not coated with the ferromagnetic material; or by heating the slave tape in the heat-treating zone by means of an infrared lamp or infrared heater from at least one side of the tape, preferably from that side of the tape on which the ferromagnetic material is not coated.

In the process of this invention, the heat-treating temperature required is at least 40°C. but less than the Curie temperature (Tc°C.) of the ferromagnetic material coated on the slave tape, preferably 70°C. to (Tc°–10)°C. Temperatures of the Curie point or higher are unsuitable since the ferromagnetic material on the slave tape may possibly be demagnetized. On the other hand, if the temperature is lower than 40°C., the effect of reducing the dimensional change of the slave tape with time is not sufficient.

In the present invention, the heat-treating temperature means the temperature of the heat-treating zone. In the case of the contact-type heat-treatment using the above hot plate, the temperature of the surface of the hot plate is the heat-treating temperature. In the non-contact-type heat-treatment, the heat-treating temperature is the atmospheric temperature of the heat-treating zone through which the slave tape is passing.

The time during which the slave tape is heated in the heat-treating zone is usually at least 0.1 second, preferably at least 0.5 second. It is usually sufficient that the upper limit of the heating time is set at about 3 seconds.

The time of performing the stretchless heat-treatment in the process of this invention may be immediately after the thermoremanent duplication by coupling the thermoremanent duplication step with the stretchless heat-treating step, or after a certain time interval from the thermoremanent duplication by performing the thermoremanent duplication step and the stretchless heat-treatment step separately. In the latter method, the time interval between the thermoremanent duplication and the stretchless heat-treatment may be several hours, for example, less than 5 hours, or as long as 24 to 48 hours.

The slave tape heat-treated without stretch in accordance with the process of this invention is dimensionally stabilized to a great extent, and its subsequent dimensional change is reduced to an extent sufficient to cause no substantial skew in the reproduced images. Accordingly, the slave tape can be subjected to a playing test at any desired time after the stretchless heat-treatment, for example, immediately after the stretchless heat-treatment. In view of the fact that with the conventional thermoremanant duplication methods, a playing test must be performed after a lapse of a long period of time, for example, one week to 100 days, from the thermoremanent duplication to ensure the quality of the slave tape, the present invention has provided a sufficiently significant improvement over the conventional methods in that even when the stretchless heat-treatment is performed 48 hours after the end of the thermoremanent duplication and immediately then, the playing test is performed, no trouble occurs in the quality of the slave tape.

The slave tapes subjected to thermoremanent duplication by the process of this invention have mechanical properties quite comparable to those of slave tapes not subjected to stretchless heat-treatment after thermoremanent duplication, and on the other hand, their dimensional change with time can be markedly reduced.

The following Examples illustrate the present invention more specifically.

EXAMPLE 1

Preparation of Polymer

A reactor equipped with a rectification column was charged with 5,000 parts of dimethyl 2,6-naphthalenedicarboxylate, 2,600 parts of ethylene glycol, 3.50 parts of calcium acetate monohydrate and 1.80 parts of antimony trioxide. The contents were heated for about 4 hours during which the temperature was raised from 165° to 230°C. After distilling off the methanol formed, 0.840 part of phosphorous acid was added to the reaction mixture. The reaction mixture was transferred into a polymerization tank, and the inside temperature of the tank was raised to 260°C. At this temperature, the product was reacted for 10 minutes at atmospheric pressure. Then, 49.60 parts of an ethylene glycol slurry containing 10% of china clay (average particle size 0.8 micron) was added, followed by reaction for an additional 40 minutes at 275°C. and 20 mmHg, and for an additional 170 minutes at 290°C. and 0.5 mmHg. Thus, a polymer (PEN-2,6) having an intrinsic viscosity of 0.63 and a china clay content of 0.1% was obtained.

Preparation of Base Film

Pellets of PEN-2,6-polymer obtained above were dried for 3 hours in a hot air current at 170°C., melted at 298°C. in an extruder, filtered through sintered stainless steel with a pore size of 20 microns, and extruded onto a casting drum at 60°C. through a T-die. The extrudate was quenched and solidified to form an unstretched film having a thickness of about 290 microns. The film was stretched longitudinally between a pair of rolls of different peripheral speeds at 130°C. at a stretch ratio of 4.5, and then stretched transversely as tentered at 128°C. at a stretch ratio of 2.6. Then, the stretched film was heat-treated at 190°C. for 20 seconds under tension. There was obtained a biaxially oriented film having a thickness of about 20 microns.

Preparation of Magnetic Tape

100 Parts by weight of ferromagnetic chromium dioxide (a product of Du Pont), 17 parts by weight of DESMOPHEN 1200 (a polyester produced by Bayer AG), 1 part by weight of dioctyl sodium sulfosuccinate, 30 parts by weight of ethyl acetate, 20 parts by weight of methyl isobutyl ketone and 40 parts by weight of toluene were mixed by a ball mill for about 30 hours, and then 79 parts by weight of DESMODUR L (an isocyanate produced by Bayer AG), 55 parts by weight of ethyl acetate, 16 parts by weight of methyl isobutyl ketone and 30 parts by weight of toluene were further added and mixed to form a magnetic coating composition. This ferromagnetic material had a Curie point of about 125°C.

The base film of polyethylene-2,6-naphthalenedicarboxylate obtained above (thickness 20 microns) was coated with the above magnetic coating composition using a gravure coater, and in the undried state, passed between two permanent magnets to orient the magnetic particles in the longitudinal direction of the film. Then, the coated film was dried at 140°C. The magnetic layer had a thickness of 6 microns. This coated film was slit to a size of one-half inch to form a slave tape.

Operation of Thermoremanent Duplication

For the thermoremanent duplication operation, there was used a thermoremanent duplication apparatus including delivery and take-up rolls for the master tape and the slave tape, drive devices for both of these rolls, a heating head comprising a hot plate for heating the slave tape at its magnetic layer surface whose temperature can be controlled and which has a dull curvature, a nip roll portion for contacting the magnetic layer of the master tape with that of the slave tape, and a device for measuring the tension of the slave tape. The temperature of the heating head was set at 150°C., and the slave tape was allowed to run while keeping the heating head in contact with the magnetic layer surface of the slave tape. At this time, the running speed of the tape was adjusted so that the contact time became 0.1 second, and a tension of 50 Kg/cm$^2$ was exerted on the tape in its longitudinal direction. Then, the master tape was brought into contact with the slave tape by means of nip rolls, and these tapes were wound up on separate take-up reels. This completed the thermoremanent duplication of the slave tape. The slave tape which was would up on a windup reel without the stretchless heat-treatment after the thermoremanent duplication, and then allowed to cool to room temperature was designated the slave tape of Run No. 1. This tape is outside the scope of the present invention, and was used as a comparison.

Stretchless Heat-treatment

A heat-treating zone was provided between the nip roll portion and the windup reel for slave tape in the above thermoremanent duplication apparatus. The slave tape after the thermoremannet duplication was immediately subjected to the stretchless heat-treatment in accordance with this invention, and then taken up on a take up reel. Then, it was allowed to cool to room temperature.

In the heat-treating zone, a plate electric heater containing a slot with a width of 10 mm was used. The slave tape which had been subjected to the same thermoremanent duplication step as in Run No. 1 was rapidly passed through heat-treating zone kept at 80°C., 100°C., and 115°C. respectively at the overfeed indicated in Table 1 to heat treat it for about 5 seconds without stretch. The slave tapes so obtained were designated slave tapes of Runs Nos. 2, 3, and 4, respectively.

Separately, a slave tape which had been subjected to the same thermoremanent duplication step as in Run No. 1 was passed, immediately after the thermoremanent duplication, through a heat-treating zone at 100°C. at an overfeed rate as shown in Table 1 to heat-treat it for about 60 seconds without stretch. The resulting slave tape was designated the slave tape of Run No. 5. The dimensional changes of these five slave tapes of Runs Nos. 1 to 5 were measured by the following method.

Two indicator points were marked on the slave tape with the distance between the two points being kept at about 1500 mm. Immediately after the thermoremanent duplicating step, a load of 2.5 Kg/cm² was exerted on the slave tape of Run No. 1. On the other hand, a load of 2.5 Kg/cm² was exerted on each of the slave tapes of Runs Nos. 2 to 5 immediately after the stretchless heat-treatment. Each of these slave tapes was then allowed to stand in an atmosphere at 20°C. and a relative humidity of 65% while it was kept under the load. The load of 2.5 Kg/cm² was exerted merely for the purpose of removing the loosening of the tape, and no substantial stretching of the tape occurred by the influence of this load. The distance between the indicator points was measured after standing in the above atmosphere for 1 hour and 100 hours respectively, and expressed as $l_1$ and $l_{100}$. The dimensional change ($\Delta l$) is given by the following equation.

$$\Delta l = \frac{l_1 - l_{100}}{l_1} \times 100 \ (\%)$$

It was confirmed that in any of the samples, the amount of dimensional change shows a substantially straight-line variation with respect to the logarithmic value of the time. Accordingly, by the dimensional change defined above, the extent of dimensional change of the samples can be compared with one another.

The results obtained are given in Table 1.

Table 1

| Run No. | Stretchless heat-treatment | | | Dimensional change ($\Delta l$) (%) |
|---|---|---|---|---|
| | Temperature (°C) | Time (sec.) | Overfeed rate (k) (%) | |
| 1 | — | — | — | 0.028 |
| 2 | 80 | 5 | 0.03 | 0.010 |
| 3 | 100 | 5 | 0.05 | 0.008 |
| 4 | 115 | 5 | 0.07 | 0.006 |
| 5 | 100 | 60 | 0.09 | 0.001 |

The dimensional changes of the sample of Runs Nos. 2 to 5 which were subjected to the stretchless heat-treatment were outstandingly low as compared with that of the sample of Run No. 1 which was not subjected to the stretchless heat-treatment, and this clearly demonstrates the great effect of the stretchless heat-treatment of this invention.

EXAMPLE 2

The same base film as produced in Example 1 was slit to a width of 6.3 mm, and used without coating a magnetic layer instead of the slave tape. The experiment was performed under the same conditions as in Example 1 except that the nip roll portion was removed and the master tape was not used. The base film was caused to run while keeping it in contact with the same heating head as used in Example 1 of which surface temperature was 150°C. At this time, the tape was caused to run at a speed such that the time of contact between the heating head and the base film was 0.1 second, and a tension of 50 Kg/cm² was exerted on the tape in its longitudinal direction. Then, the film was allowed to cool to room temperature. A sample of Run No. 1 was prepared without performing the stretchless heat-treatment after the above heating under tension. On the other hand, sample of Runs Nos. 2 to 5 were prepared by performing the stretchless heat-treatment under the conditions shown in Table 2 immediately after the heating under tension. The dimensional changes ($\Delta l$) of these base films were measured, and the results are shown in Table 2.

Table 2

| Run No. | Stretchless heat-treatment | | | Dimensional change ($\Delta l$) (%) |
|---|---|---|---|---|
| | Temperature (°C) | Time (seconds) | Overfeed rate (k) (%) | |
| 1 | — | — | — | 0.034 |
| 2 | 80 | 5 | 0.05 | 0.016 |
| 3 | 100 | 5 | 0.07 | 0.014 |
| 4 | 115 | 5 | 0.09 | 0.008 |
| 5 | 100 | 60 | 0.12 | 0.001 |

Since the dimensional change with time of the slave tape in a thermoremanent duplication process is scarcely affected by the magnetic layer, but affected mainly by the base film, almost similar experimental results to those in Example 1 were obtained in the present Example in which a base film not coated with a magnetic layer was used instead of the slave tape. This clearly demonstrates that the stretchless heat-treatment of this invention has an effect of markedly reducing the dimensional change of the tape.

EXAMPLE 3

Preparation of Film

Chips of polyethylene terephthalate having an intrinsic viscosity of 0.63 and a china clay content of 0.13% were dried for 3 hours in a hot air current at 170°C. The dried chips were melted at 285°C., filtered, and extruded through a T-die onto a casting drum at 40°C., followed by quenching and solidification to form an unstretched film having a thickness of about 280 microns. The film was stretched longitudinally at a stretch ratio of 4.4 at 80°C. between a pair of rolls having different peripheral speeds, and then stretched transversely at a stretch ratio of 2.8 at 85°C. using a tenter. The stretched film was heat-treated for about 20 seconds in a hot air current at 190°C. under tension. There was obtained a biaxially oriented film having a thickness of about 20 microns.

Preparation of Magnetic Tape

100 Parts by weight of ferromagnetic chromium dioxide (product of Du Pont), 17 parts by weight of an epoxy resin (EPON 1001, the tradename for a product of Shell Oil Corporation, having a melting point of 64° to 74°C., an epoxide equivalent of 450 to 500, and an average molecular weight of 900), 12 parts by weight of a polyamide resin (VERSAMIDE No. 115, the tradename for a product of General Mill Corporation, having an amine value of 210 to 230 and an average molecular weight of 100 to 4000), 9 parts by weight of a polyvinyl butyral (BL-2, a product of Sekisui Chemical Co., Ltd., having a degree of polymerization of 450 and a degree of butyralization of 60 to 70), 0.9 part by weight of dodecylbenzenesulfonic acid, 0.9 part of stearic acid, 40 parts by weight of ethyl methyl ketone, 20 parts by weight of methyl isobutyl ketone, and 40 parts by weight of toluene were mixed by a ball mill for about 30 hours. Furthermore, 30 parts by weight of ethyl methyl ketone, 15 parts by weight of methyl isobutyl ketone and 30 parts by weight of toluene were added, and they were mixed for 2 hours to form a magnetic coating composition. The Curie point of this ferromagnetic material was about 125°C.

The polyethylene terephthalate base film (about 20 microns) obtained above was coated with the magnetic coating composition using a gravure coater, and passed in the undried state between two opposing permanent magnets to orient the magnetic particles in the longitudinal direction of the film, and then dried at 130°C. The thickness of the magnetic layer was 6 microns. The coated film was slit to a width of one-half inch to form a slave tape.

The operation of thermoremanent duplication was carried out in quite the same way as in Example 1. A sample of Run No. 1 was prepared without performing the stretchless heat-treatment after the thermoremanent duplication in the same way as in Run No. 1 of Example 1.

On the other hand, samples of Runs Nos. 2 and 3 were prepared by performing the stretchless heat-treatment under the conditions shown in Table 3 using the same apparatus as in Example 1 except that a hot air oven adapted to permit the running of the tape therethrough was used as the heat-treating zone instead of the plate electric heater. The dimensional changes ($\Delta l$) of the slave tapes of Runs Nos. 1 to 3 were measured by the same method as used in Example 1, and the results obtained are shown in Table 3.

Table 3

| Run No. | Stretchless heat-treatment | | | Dimensional |
| | Temperature (°C) | Time (seconds) | Overfeed rate (%) | ($\Delta l$) (%) |
| --- | --- | --- | --- | --- |
| 1 | — | — | — | 0.033 |
| 2 | 75 | 3 | 0.06 | 0.022 |
| 3 | 115 | 3 | 0.12 | 0.014 |

EXAMPLE 4

Runs Nos. 1 to 6 were carried out under the conditions shown in Table 4 using the same slave tapes as used in Example 1 and the same apparatus as used in Example 3. In Table 4, the samples of Runs Nos. 5 and 6 are tapes which were heat-treated with stretch instead of the stretchless heat-treatment in accordance with this invention, and therefore outside the scope of the present invention.

Table 4

| Run No. | Heat-treatment | | | Dimensional |
| | Temperature (°C) | Time (seconds) | Overfeed rate (k) (%) | change ( ) (%) |
| --- | --- | --- | --- | --- |
| 1 | 75 | 7 | 0.03 | 0.010 |
| 2 | 75 | 7 | 0 | 0.016 |
| 3 | 115 | 8 | 0.05 | 0.008 |
| 4 | 115 | 8 | 0 | 0.018 |
| 5 | 75 | 7 | −0.06* | 0.032 |
| 6 | 115 | 8 | −0.05* | 0.036 |

*This symbol shows the case where the withdrawal rate ($V_2$) of the slave tape was higher than its feed rate ($V_1$).

It can be seen from the experimental results shown in Table 4 that is Runs Nos. 5 and 6 in which the overfeed rate ($k$) is negative, the dimensional change is higher than in Run No. 1 of Example 1, and there is no effect of reducing the dimensional change. In Runs Nos. 2 and 4 in which the withdrawal rate ($V_2$) is the same as the feed rate ($V_1$) (that is, $k=0$), the effect of reducing the dimensional change is somewhat lower than Run No. 1 in which the overfeed rate is 0.03 and Run No. 3 in which the overfeed rate is 0.05, but a sufficient effect of reducing the dimensional change is observed as compared with Run No. 1 of Example 1 in which no stretchless heat-treatment was performed.

What is claimed is:

1. A process for thermoremanent duplication of magnetic signals of a magnetic recording master tape on a magnetic recording slave tape consisting of a polyester film base and a layer of a ferromagnetic material coated thereon, which comprises the following steps of
   i. heating said slave tape above the Curie point of said ferromagnetic material,
   ii. contacting said master tape and said slave tape,
   iii. cooling said slave tape below its Curie point while contacted with said master tape,
   iv. separating said master tape and said slave tape, and then
   v. heat-treating said slave tape without stretch at a temperature of at least 40°C. but less than the Curie point of said ferromagnetic material for at least 0.1 second.

2. The process of claim 1 wherein the heat-treating temperature is 70°C. to a point 10°C. lower than the Curie point of said ferromagnetic material.

3. The process of claim 1 wherein said polyester is a member selected from polyesters at least 90 mol% of which recurring units consist of ethylene 2,6-naphthalene dicarboxylate, ethylene terephthalate and 1,4-cyclohexane terephthalate.

4. The process of claim 1 wherein said ferromagnetic material is a chromium dioxide-type ferromagnetic material.

5. The process of claim 1 wherein said stretchless heat-treatment comprises continuously feeding the slave tape after thermoremanent duplication into a heat-treating zone by means of a roller unit, allowing it to pass through the zone, and then withdrawing it from the zone, wherein the slave tape is fed at an overfeed rate ($k$), as defined by the following equation, of 0 to 2%

$$k = \frac{V_1 - V_2}{V_2} \times 100 \ (\%)$$

in which $V_1$ is the rate of feeding the slave tape into the heat-treating zone, and $V_2$ is the rate of withdrawing the slave tape from the heat-treating zone.

6. The process of claim 5 wherein the overfeed rate is 0.02 to 2%.

7. The process of claim 1 wherein said stretchless heat-treatment is performed immediately after the thermoremanent duplication.

8. The process of claim 1 wherein said stretchless heat-treatment is performed within 5 hours after the thermoremanent duplication.

9. The process of claim 1 wherein said stretchless heat-treatment is performed 24 to 48 hours after the thermoremanent duplication.

10. The process of claim 1 wherein said heat-treating is for at least 0.5 seconds.

UNITED STATES PATENT AND TRADEMARK OFFICE
CERTIFICATE OF CORRECTION

PATENT NO. : 3,947,872
DATED : March 30, 1976
INVENTOR : Takeo Asai

It is certified that error appears in the above-identified patent and that said Letters Patent are hereby corrected as shown below:

Claim 3, line 4, delete "and", insert -- or --

Signed and Sealed this eighth Day of June 1976

[SEAL]

Attest:

RUTH C. MASON
Attesting Officer

C. MARSHALL DANN
Commissioner of Patents and Trademarks